US009278707B2

(12) United States Patent
Witting et al.

(10) Patent No.: US 9,278,707 B2
(45) Date of Patent: Mar. 8, 2016

(54) STEERING YOKE

(71) Applicant: Saint-Gobain Performance Plastics Corporation, Aurora, OH (US)

(72) Inventors: Nicholas Witting, Clark, NJ (US); Joseph Liquore, Randolph, NJ (US); Timothy J. Hagan, Succasunna, NJ (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 0 days.

(21) Appl. No.: 14/095,620

(22) Filed: Dec. 3, 2013

(65) Prior Publication Data

US 2014/0082925 A1    Mar. 27, 2014

Related U.S. Application Data

(60) Division of application No. 13/745,983, filed on Jan. 21, 2013, now Pat. No. 8,621,950, which is a continuation of application No. 12/488,064, filed on Jun. 19, 2009, now Pat. No. 8,375,818.

(60) Provisional application No. 61/074,413, filed on Jun. 20, 2008, provisional application No. 61/081,816, filed on Jul. 18, 2008.

(51) Int. Cl.
*F16C 27/02*        (2006.01)
*B62D 3/02*         (2006.01)
(Continued)

(52) U.S. Cl.
CPC ........ *B62D 3/02* (2013.01); *B62D 3/123* (2013.01); *F16C 17/04* (2013.01); *F16C 25/08* (2013.01);
(Continued)

(58) Field of Classification Search
CPC .......... B62D 3/02; B62D 3/123; F16C 27/02; F16C 17/04; F16C 25/08; F16H 55/283; Y10T 29/49641; Y10T 74/1967; Y10T 29/4998; Y02T 10/865
See application file for complete search history.

(56) References Cited

U.S. PATENT DOCUMENTS 4,785,685 A    11/1988   Kobayashi et al.
5,622,085 A     4/1997   Kostrzewa
(Continued)

FOREIGN PATENT DOCUMENTS

EP    1839846 A1    10/2007
JP    57159055 U    10/1982
(Continued)

OTHER PUBLICATIONS

European Search Report from EP Application No. 09 76 7823 dated Mar. 8, 2012 (1 pg).
(Continued)

*Primary Examiner* — David Bryant
*Assistant Examiner* — Jun Yoo
(74) *Attorney, Agent, or Firm* — Chi Suk Kim; Abel Law Group, LLP

(57) ABSTRACT

A steering yoke is disclosed and includes a hollow cylindrical body that can be formed from a laminated sheet of metal and polymer. The hollow cylindrical body includes a substantially uniform wall thickness. Further, the hollow cylindrical body can include a first half, a second half, a seam extending at least partially along the body between the first half and the second half, an upper end having a surface, and a lower open end. The steering yoke can also include a bearing surface coupled to the surface of the upper end of the hollow cylindrical body and a spring perch disposed in the lower end of the hollow cylindrical body. The spring perch can include a spring pocket configured to support and retain a spring for supplying a biasing force to the yoke.

20 Claims, 11 Drawing Sheets

(51) Int. Cl.
*B62D 3/12* (2006.01)
*F16C 17/04* (2006.01)
*F16C 25/08* (2006.01)
*F16H 55/28* (2006.01)

(52) U.S. Cl.
CPC .............. *F16C 27/02* (2013.01); *F16H 55/283* (2013.01); *Y02T 10/865* (2013.01); *Y10T 29/4998* (2015.01); *Y10T 29/49641* (2015.01); *Y10T 74/1967* (2015.01)

(56) References Cited

U.S. PATENT DOCUMENTS

| | | | | |
|---|---|---|---|---|
| 5,906,138 | A * | 5/1999 | Kostrzewa | ................ 74/498 |
| 6,258,413 | B1 | 7/2001 | Woelki et al. | |
| 8,375,818 | B2 | 2/2013 | Witting et al. | |
| 8,621,950 | B2 | 1/2014 | Witting et al. | |
| 8,783,125 | B2 * | 7/2014 | Matsuhisa | ............ 74/388 PS |
| 2005/0039560 | A1 | 2/2005 | Degorce et al. | |
| 2007/0163375 | A1 | 7/2007 | Counts | |

FOREIGN PATENT DOCUMENTS

| | | |
|---|---|---|
| JP | S63-11273 U | 1/1988 |
| JP | S64-7074 U | 1/1989 |
| JP | H02107819 A | 4/1990 |
| JP | H02-117968 U | 9/1990 |
| JP | 08-133099 A | 5/1996 |
| JP | H102335 A | 1/1998 |
| JP | 11-190345 A | 7/1999 |
| JP | H11302487 A | 11/1999 |
| JP | 2003-040116 A | 2/2003 |
| JP | 2003-117623 A | 4/2003 |
| JP | 18-69381 | 3/2006 |
| KR | 20-1999-0024011 | 7/1999 |
| KR | 10-2004-0056524 | 7/2004 |

OTHER PUBLICATIONS

International Search Report and Written Opinion dated Aug. 27, 2009 issued in corresponding PCT Application No. PCT/US2009/047949, 11 pages.

* cited by examiner

STEERING YOKE

CROSS-REFERENCE TO RELATED APPLICATION

The present application is a divisional application of U.S. patent application Ser. No. 13/745,983, filed Jan. 21, 2013, entitled "STEERING YOKE," naming inventors Nicholas Witting, Joseph Liquore, and Timothy J. Hagan, which claims priority from U.S. patent application Ser. No. 12/488,064, filed Jun. 19, 2009, entitled "STEERING YOKE," naming inventors Nicholas Witting, Joseph Liquore, and Timothy J. Hagan, which claims priority from U.S. Provisional Patent Application No. 61/074,413, filed Jun. 20, 2008, entitled "STEERING YOKE," naming inventors Nicholas Witting, Joseph Liquore, and Timothy J. Hagan, and U.S. Provisional Patent Application No. 61/081,816, filed Jul. 18, 2008, entitled "STEERING YOKE" naming inventors Nicholas Witting, Joseph Liquore, and Timothy J. Hagan, which applications are all incorporated by reference herein in their entirety.

BACKGROUND

1. Field of Invention

The invention relates to bearings and, in particular, to steering yoke bearings and bearing assemblies.

2. Discussion of Related Art

Many vehicles use rack and pinion steering gear to translate motion from the steering wheel to the turning wheels on the road. In these systems, the steering wheel is joined to a pinion gear that includes gear teeth that are mated with teeth on a rack shaft. As the pinion gear rotates, the motion is translated into linear motion of the rack shaft that is connected to tie rods. The tie rods then rotate the turning wheels to cause the vehicle to turn. To assure proper lash between the pinion and the rack shaft a steering yoke assembly may be used to provide a biasing force that forces the shaft into the pinion gear. The yoke may also be referred to as a "yoke assembly," "yoke slipper," or "puck." The rack shaft (typically steel) slides along the yoke when the pinion gear is rotated. Friction between the shaft and the yoke can be minimized by using a low friction bearing on the contact surface of the yoke. Other friction reducing methods include the use of rolling elements (balls) and the addition of lubricants such as grease. These steering systems may be mechanical, hydraulic or electric.

SUMMARY

Disclosed herein are a variety of devices and methods directed to the manufacture and use of a steering yoke that may be useful in applications such as rack and pinion steering assemblies. The steering yoke may be hollow and can include a circular groove designed to complement and support a steering rack shaft. The groove may include a low friction coating that can be formed from a polymer. The yoke may also include a spring perch constructed and arranged to seat a spring that provides a biasing force to the steering yoke bearing.

In one aspect a steering yoke is provided, the steering yoke comprising a hollow cylinder including an first end and a second end, the first end defining at least one of: an arcuate indent for receiving a steering rack shaft wherein the arcuate indent includes a contact surface comprising a low friction polymer layer; and a spring perch constructed and arranged to support and retain a spring for supplying a biasing force to the yoke.

In another aspect a method of forming a steering yoke body is provided, the method comprising the steps of drawing a metal/polymer laminate over a die to produce a substantially hollow form having a top surface and an open bottom, and forming in the top surface at least one of: a concave arcuate groove shaped to complement a steering rack shaft; and a spring perch constructed and arranged to support a spring for supplying a biasing force to the yoke body.

In another aspect, a method of forming a steering yoke body is provided, the method comprising the steps of rolling a metallic sheet into a cylinder, affixing the adjoining edges of the sheet to each other, and attaching a concave arcuate bearing surface to one end of the cylinder, the bearing surface constructed and arranged to receive a steering rack shaft.

The subject matter of this application may involve, in some cases, interrelated products, alternative solutions to a particular problem, and/or a plurality of different uses of a single system or article.

DETAILED DESCRIPTION

In one aspect a steering yoke and steering yoke assembly are described in which the bearing contact surface of the yoke exhibits reduced friction that allows for a greater biasing force against the rack shaft. This increased biasing force can result in reduced noise and vibration in the steering column. Lower friction levels can also enable the use of lower levels of power assistance enabling the use of electric motors or electric powered hydraulic pumps. In many cases it can be important to have substantially low, consistent coefficients of friction over the life of the yoke bearing and yoke assembly.

In another aspect, reduced noise and vibration in a steering system can be realized through the use of a substantially hollow yoke assembly. When compared to cast, machined or injection molded yoke assemblies, a substantially hollow yoke may reduce vibration. Hollow yokes ("cans") can be produced by forming the can from a sheet or by drawing a sheet of material over a die in one or more steps. The sheet material may be a laminate of a metal and a polymer. A "hollow yoke" is a yoke that is substantially hollow rather than solid throughout the yoke body. The hollow yoke has an interior cavity that may be empty or may be filled with another material. In various embodiments the bearing may be used with or without grease.

Figure 1:
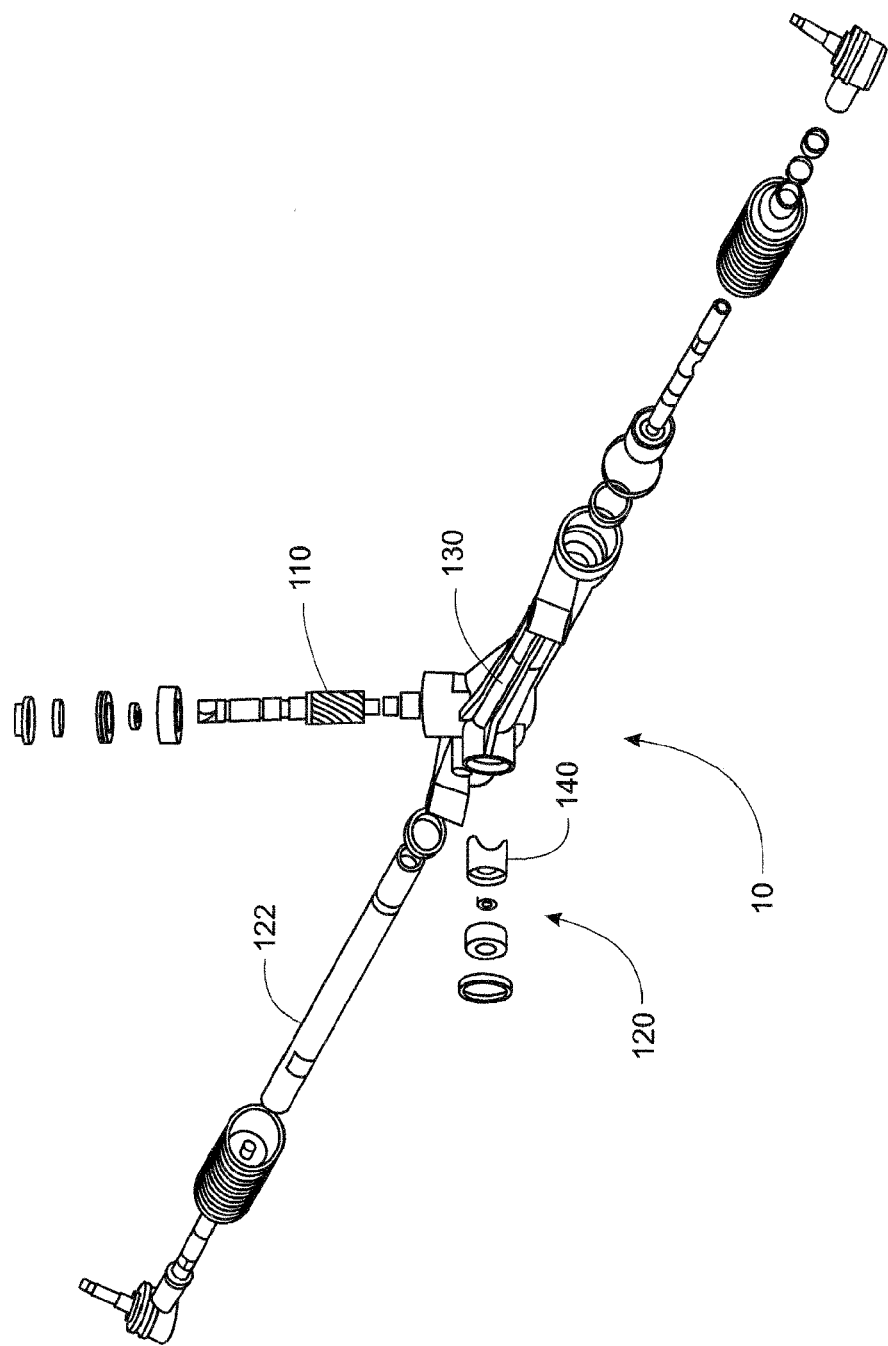
FIG. 1 is an exploded diagram of a rack and pinion steering system.
Figure 2:
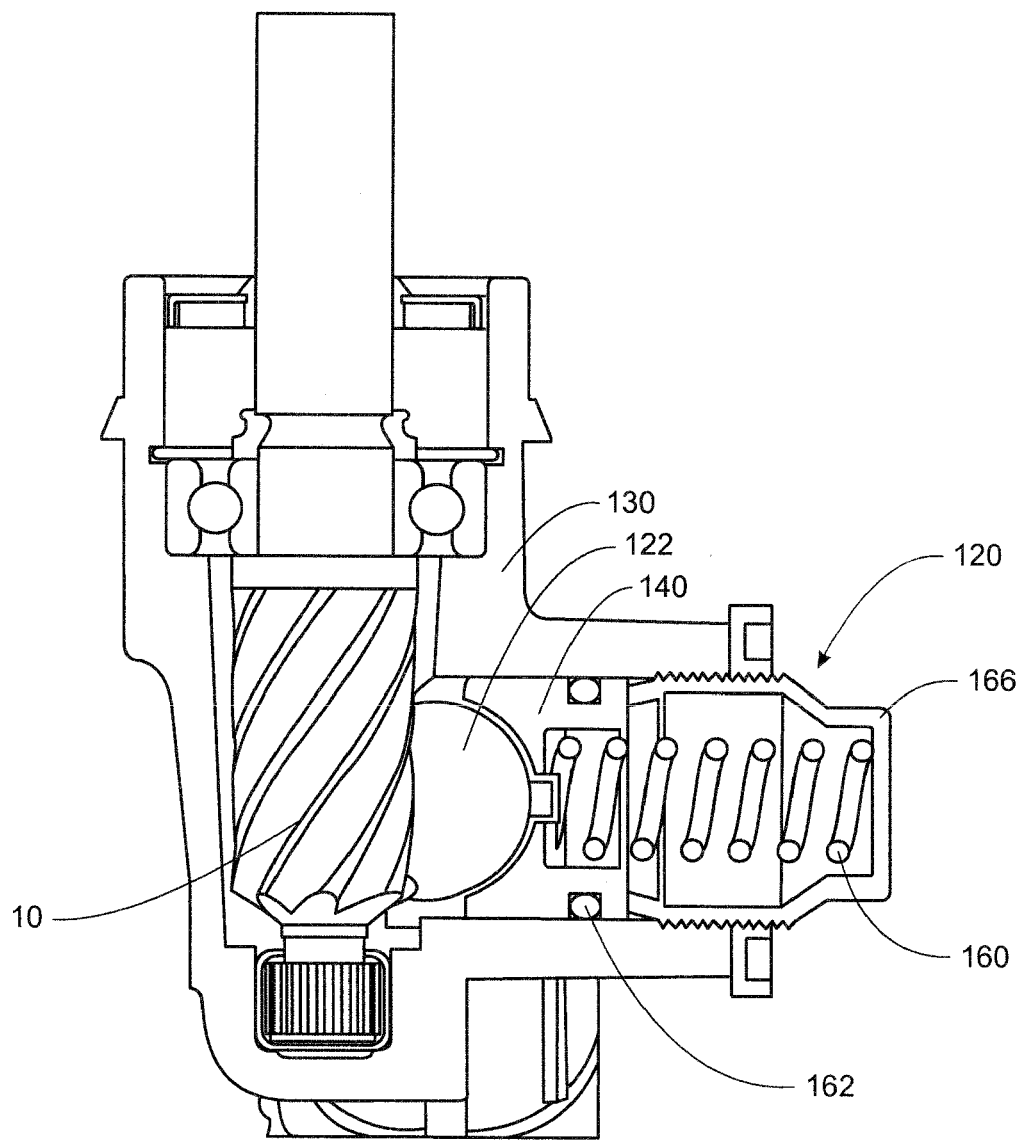
FIG. 2 is a cutaway view of a portion of a rack and pinion steering system.

An exploded view of a typical steering assembly 10 is provided in FIG. 1. Helical pinion gear 110 is mated with teeth on a rack shaft (not shown in FIG. 1). Yoke assembly 120 is inserted into pinion housing 130 and provides a biasing force that causes the rack shaft to maintain proper lash with the pinion gear 110. The system is typically lubricated with a grease such as a lithium grease. FIG. 2 provides a cutaway view of a portion of the steering mechanism of FIG. 1. Helical pinion gear 110 is mated with rack shaft 122 which maintains mechanical contact with the aid of steering yoke 140. Steering yoke 140 is pressured against pinion gear 110 by spring 160. Spring 160 is compressed and retained by threaded cap 166. O-ring 162 is seated in a channel that circumscribes yoke 140. The O-ring may also be seated in a groove that circumscribes the inner surface of housing 130. When an operator turns the steering wheel of the vehicle, pinion gear 110 rotates causing rack shaft 122 to slide either in or out of the page as configured in FIG. 2. The rack shaft 122 slides against a stationary yoke 140 which maintains a biasing force that keeps the gear and shaft meshed together. A stronger biasing force can help to achieve a less noisy steering mechanism, however, if a stronger force is provided by spring 160 a greater amount of friction and resulting wear will occur between yoke 140 and rack shaft 122.

Existing steering yokes are typically made from die cast metal or injection molded plastic to which a low friction liner is attached. It has been found that these solid materials can transmit vibration and noise resulting in undesirable vibrations in the steering mechanism. This system noise and vibration may worsen as the yoke ages and is typically detected at the steering wheel through "driver feel." Some of the yokes described herein employ a hollow body design that surprisingly results in a reduction in the transmission of noise and vibration. A hollow yoke can also reduce the weight of the steering mechanism.

A steering mechanism can be exposed to a wide range of temperatures that may be the result of, for example, environmental temperature shifts or temperature increases due to work and/or friction. As steering yokes are typically made of different material than the housing (often aluminum) in which they are encased there may be tolerances built into the yoke that allow for thermal expansion and contraction of the yoke in the housing. But these tolerances can also result in excessive clearance between the yoke and the shaft and the housing. This excessive clearance can result in additional noise in the system. Having determined one of the causes of this excessive noise, a hollow aluminum yoke having similar or identical thermal expansion characteristics can be made to tighter tolerances and can reduce the amount of play, providing a quieter steering mechanism with reduced vibration.

Figure 3A:
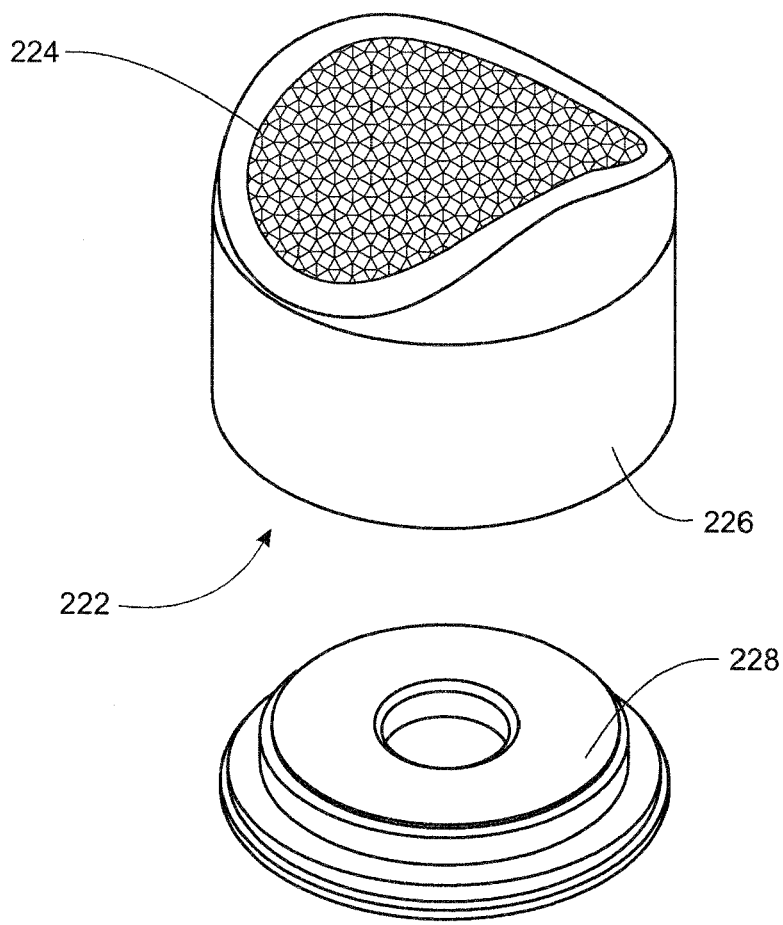
FIG. 3A is a perspective view of an embodiment of a drawn steering yoke.

A hollow yoke may be constructed in a number of ways. For instance, the yoke may be extruded, formed, molded, pressed, rolled, machined, or any combination of these processes. In one set of embodiments, a metal or metal/polymer sheet is transformed into a yoke. For example, a hollow yoke can be constructed by drawing a stamped metal sheet or metal/fluoropolymer laminate over a die. Alternatively, a low friction layer, such as an acetal resin, may be mechanically attached to the bearing surface. Additional steps may be used to form a concave arcuate portion at one end that is constructed and arranged to support a steering rack shaft. The arcuate portion may be a partial cylinder as shown in FIG. 3A.

In cases where the drawn material does not include a fluoropolymer, a lubricious bearing surface can be attached to the yoke body by, for example, a boss (FIG. 5), a press fit, or an adhesive. A hollow yoke may also be produced by wrapping a sheet of metal or metal/fluoropolymer laminate into a three dimensional shape that may be cylindrical or substantially cylindrical. The edges may be joined by, for example, welding. A hollow yoke may include a cylinder wall that has a thickness of less than 5 mm, less than 2 mm, less than 1 mm or less than 0.5 mm. An end cap may be added in a separate step and may be of a similar or dissimilar material. A polymeric bearing surface, such as an acetal resin or a fluoropolymer, may also be added to the end cap. If the can is produced from a metallic sheet, a fluoropolymer layer may be attached to the outer metal surface by mechanical or adhesive means.

Figure 3B:
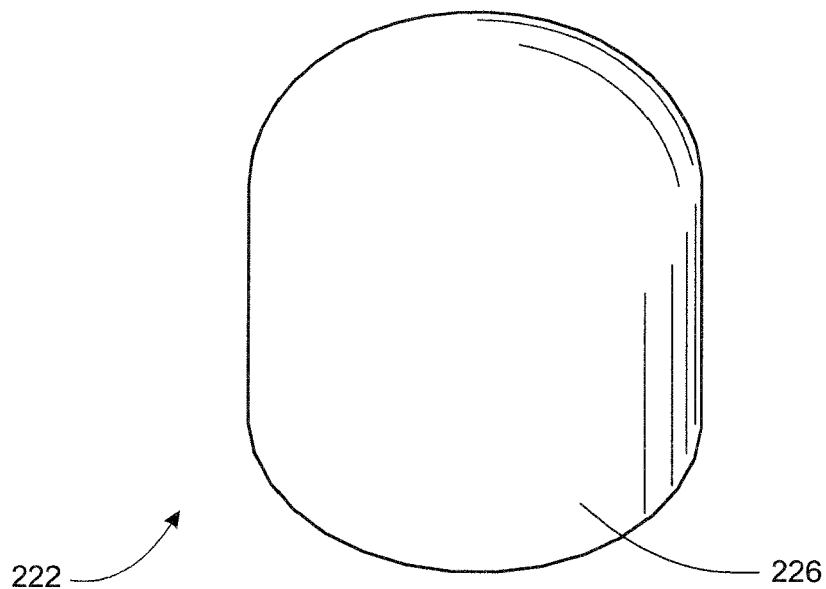
FIG. 3B is a perspective view of one step in the production of one embodiment of a drawn steering yoke.
Figure 3C:
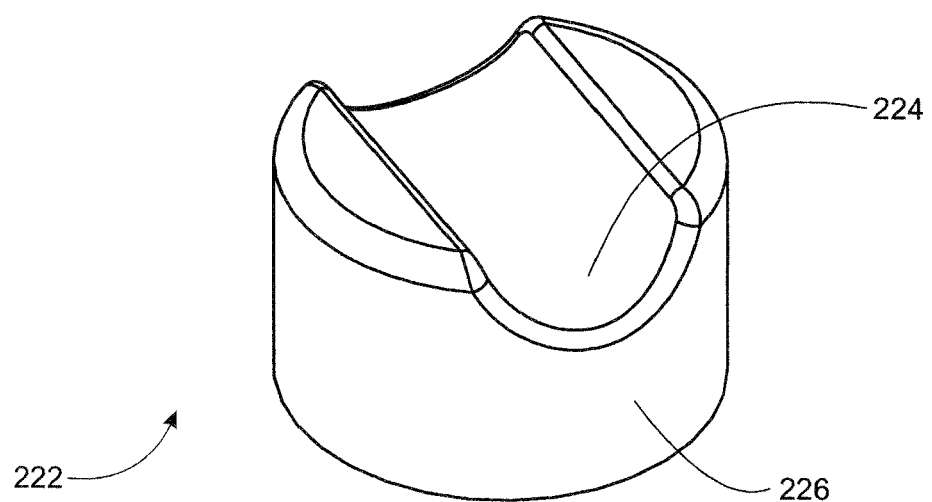
FIG. 3C is a perspective view of another step in the production of the embodiment shown in FIG. 3B.

In one aspect of the invention, a portion of the yoke that does not contact the rack shaft may include a polymer layer. This portion may be, for example, the exterior surface of the walls of the cylindrical portion as shown in FIGS. 3A-3C. This may be in addition to the inclusion of a polymeric layer on arcuate surface 224 which supports a reciprocating shaft. Cylinder wall 226 may not be in contact with the reciprocating steering shaft but can also include a polymer (e.g., fluoropolymer) layer. It has been learned that a fluoropolymer layer on cylinder wall 226 can provide for a quieter, more secure fit in a yoke housing. In addition, manufacturing tolerances can be eased as a solid fluoropolymer may "cold flow," allowing the yoke to be pressed into a housing that would be too tight to accept the yoke if it comprised only an aluminum or steel cylinder wall fitted into a steel or aluminum housing. This feature can also minimize noise and vibration as the yoke can be inserted into the housing with zero clearance. One result can be improved feel at the steering wheel throughout the life of the steering mechanism.

In one set of embodiments, the contact surface of the yoke may comprise a polymer such as a laminate of a fluoropolymer over a metal substrate. The fluoropolymer may be adhered to the substrate by, for example, mechanical adhesion or lamination with a fluoropolymer hot melt adhesive. The fluoropolymer may be, for example, PTFE, and the metal may be, for example, aluminum, steel, bronze, copper or alloys thereof. The laminate may be free of lead. The polymer may include one or more fillers such as graphite, glass, aromatic polyester (EKONOL®), bronze, zinc, boron nitride, carbon and/or polyimide. One embodiment includes both graphite and polyester fillers. Concentrations of each of these fillers in a polymer such as PTFE may be greater than 1%, greater than 5%, greater than 10%, greater than 20% or greater than 25% by weight. Additional layers, such as a bronze mesh between the metal and the fluoropolymer, or embedded in the fluoropolymer, may also be used. Such materials include the NORGLIDE® line of products available from Saint-Gobain Performance Plastics Inc. Suitable examples of NORGLIDE products include NORGLIDE PRO, M, SM, T and SMTL. The thickness of the fluoropolymer layer may vary or be constant across the substrate. The fluoropolymer layer may have an average thickness in the contact zone of greater than or equal to 30 µm, 50 µm, 75 µm, 100 µm, 150 µm, 200 µm, or 250 µm. Thicker fluoropolymer layers have been shown to provide a more consistent bearing load over the life of the yoke. In some embodiments, the metal substrate may have a nominal thickness of, for example, from 100 µm to 5 mm. More specific ranges include 200 µm to 4 mm for aluminum and 200 µm to 1.23 mm for steel.

The contact surface of the yoke may be textured so that some portions of the surface are higher than other portions. Texturing may include a plurality of peaks and valleys. The peaks may measure greater than or equal to 10 µm, 20 µm, 50 µm, 100 µm or 200 µm above the adjacent valley. The texturing of the surface can provide numerous reservoirs for retaining grease. The texture may be patterned or random and can be consistent across the contact surface. In one embodiment, a patterned textured surface may be formed by depositing a fluorocarbon layer over a screen, such as a bronze mesh. When assembled, the smooth surface of the steel rack shaft may contact the yoke at numerous high points, or peaks, across the contact surface. Contact points may be distributed across the surface so that the force between the yoke and the rack shaft is born by a large portion of the arcuate region. For example, the contact points may be found on more than 50%, more than 70%, more than 80% or more than 90% of the arcuate surface region. The force may be substantially equally distributed between central and edge portions of the arcuate region. Thus, the pressure exerted by the yoke against the cylindrical rack shaft may be substantially equivalent across the width and length of the bearing surface. This is in contrast to alternative designs, e.g., gothic arches, in which two distinct lines of contact are provided between the rack shaft and the bearing surface. In a "gothic arch" design, the surface of the bearing is constructed with an offset radius to promote two regions of contact with the rack shaft. These linear regions typically run parallel to the axis of the rack shaft and may be, for example, at 45 degrees from the center of the shaft. This design is believed to reduce drag between the bearing surface and the rack shaft. As the bearing surface is worn in, the area of these two linear regions may expand until the entire bearing surface is in contact with the rack shaft. This additional surface area contact contributes to a higher coefficient of friction that has been measured in worn bearings. Thus, due to the change in contact area over time a gothic arch design yoke may exhibit a much lower coefficient of friction when new than after 100,000 or 200,000 cycles.

In one set of embodiments, a bearing surface is shaped to contact the rack shaft with equal force at the central and peripheral portions of the bearing surface. This may allow for a greater biasing force to be applied to the yoke and shaft, resulting in a quieter mechanism. Although such a design has historically been considered to provide too much friction for this application, it has been found that by using the bearing surfaces described herein that the coefficient of friction (COF) can be as low as or lower than with gothic arch designs. Bearing surfaces can incorporate this design in new, unused bearings and the area of contact between the rack shaft and the low COF polymer will remain substantially constant over the life of the bearing. This is in contrast to the increasing COF that has been found over the lifetime of conventionally designed bearings that do not initially provide contact across a majority of the bearing surface.

In most steering yoke designs, the bearing surface is biased against the rack shaft by a spring (in compression), such as spring 160 as shown in FIG. 2. The bearing load at the bearing/shaft interface typically changes as the bearing surface wears because as the spring expands to retain contact between the worn bearing surface of the yoke and the rack shaft, the force applied by the spring decreases. Therefore, wear in the bearing surface is typically accompanied by a corresponding drop in bearing load. This drop in load can result in, for example, undesirable noise and vibration. It has been found that bearing surfaces including fluoropolymer layers of greater than 100 IJm can result in a consistent bearing load over 100,000 or 200,000 cycles.

FIG. 3A provides a perspective view of one embodiment of a steering yoke assembly. Hollow yoke 222 includes an open bottom (not shown), a substantially cylindrical wall 226 and an arcuate upper surface 224 that has a radius of curvature that is substantially equivalent to that of the rack shaft with which the yoke is designed to interface with. The arcuate depression in the surface may be a groove that has a circular radius and exhibits a partially circular cross-section. The groove may complement a cylindrical steering rack shaft and a majority of the surface of the groove may be in contact with the steering rack shaft when a biasing force is applied. The hollow yoke 222 may be a drawn can that may include a cylindrical or other shaped wall Spring perch 228 can be attached to yoke 222 via threads, press fitting, welding or an alternative connector. A spring (not shown in FIG. 3) similar to that shown in FIG. 2 can be positioned against spring perch 228 to provide a biasing force to the yoke 222. The perch can provide a substantially planar surface that helps to equalize the spring force across the contact surface of the yoke. Yoke 222 may be formed by drawing a laminate sheet into the shape shown. The drawing process may include one or more shaping steps and may include the use of one, two or more dies. For instance a stamped, round sheet may be drawn into the can shape shown in FIG. 3B. In a subsequent step, the contact surface may be indented to form a concave arcuate surface as shown in FIG. 3C. The die used to form the concave arcuate feature may have a radius substantially equivalent to that of the rack shaft that the yoke is designed to interface with. FIG. 3C provides an example of a yoke drawn from a laminate of PTFE/EKONOL on aluminum. The yoke shape of FIG. 3C also exhibits a surprisingly high compression strength allowing it to withstand forces equal to or greater than those to which solid yokes are typically exposed in rack and pinion steering systems.

Figure 3D:
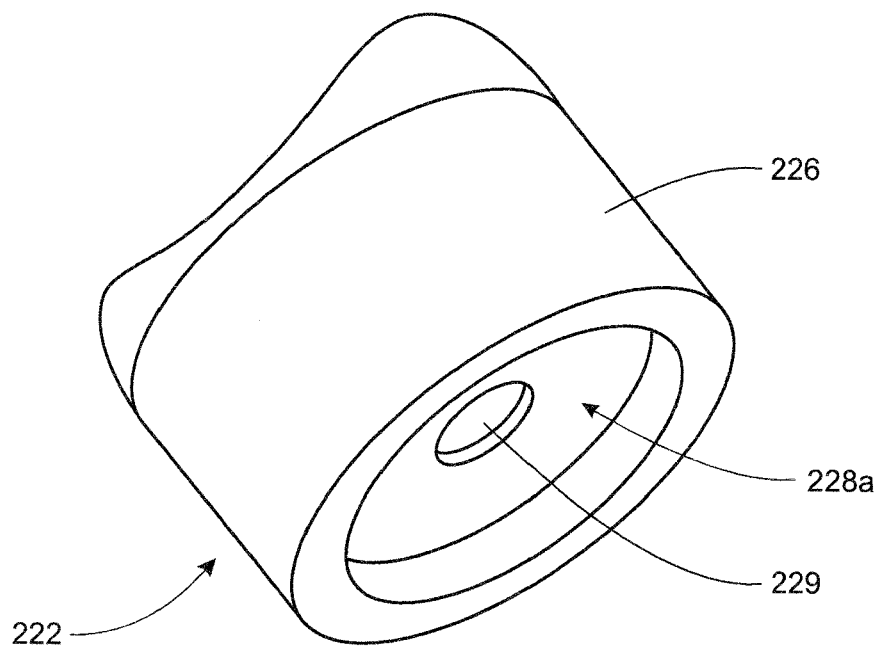
FIG. 3D is an embodiment related to the embodiment of FIG. 3A.

FIG. 3D illustrates a steering yoke assembly with an integral spring pocket 228a. An integral spring pocket is a spring pocket that is formed when the yoke itself is shaped. For instance, the yoke and spring pocket may be formed from the same blank. The inclusion of integral spring pocket 228a can eliminate the need for the addition of a separate spring perch as in FIG. 3A. In one embodiment, spring pocket 228a can be produced by drawing a blank (that includes portion 228a in a pre-formed state) over a die to produce the hollow can shown in FIG. 3D. The concave portion of spring pocket 228a can be formed in a second operation using a second die or in the same step by using two opposed dies. In this embodiment, bearing surface 224 can be attached to the yoke assembly after the can has been drawn. Spring pocket 228a includes a concave indent for receiving a spring that can provide a biasing force that is transmitted through the yoke to the rack shaft. Spring pocket 228a may include orifice 229. The surface of spring pocket 228a may be metallic or include a polymer layer such as a fluoropolymer layer.

Figure 4A:
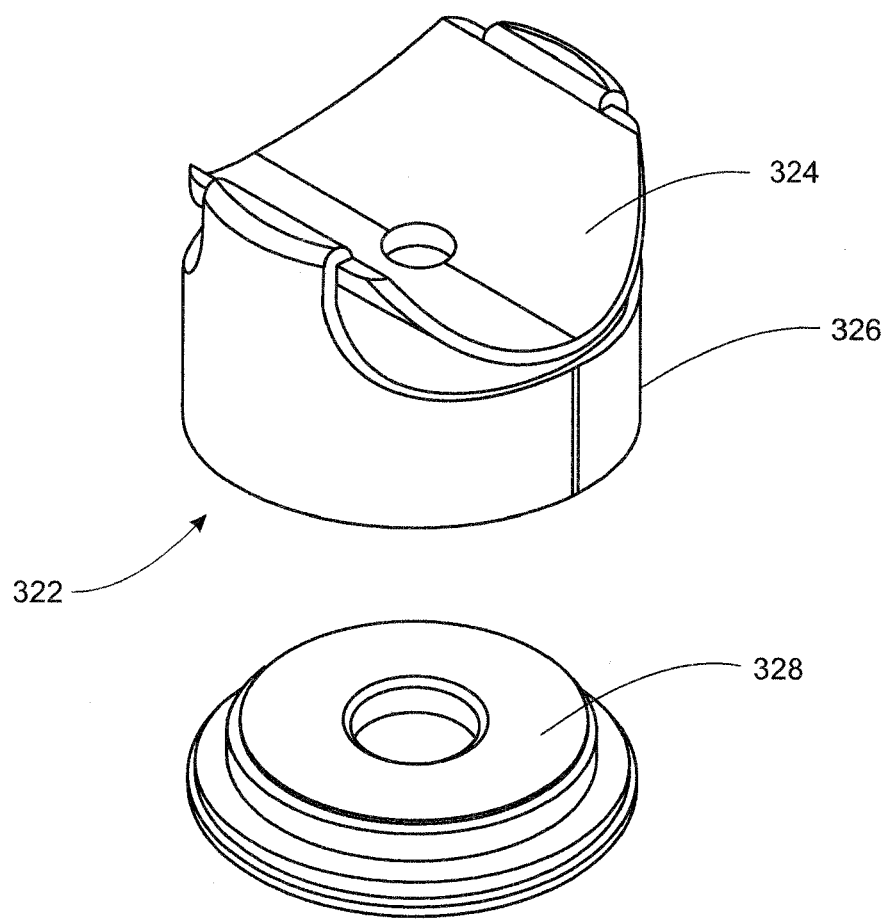
FIG. 4A is a perspective view of another embodiment of a steering yoke.

FIG. 4A illustrates another embodiment wherein the contact surface 324 can be stamped and folded to form an arcuate, partially cylindrical surface. Contact surface 324 may be cut from a planar sheet such as a metallic sheet or laminate using a stamping die and may then be folded or bent around a cylinder having the same radius as that of the intended rack shaft. This piece may then be attached, e.g., by welding, to cylindrical base 326 to from yoke 322. Base 326 may be of metal, plastic or other material but need not be PTFE as it does not contact a moving part. Spring perch 328, as above, can be used to provide a flat surface to transmit the spring force to the yoke.

Figure 4B:
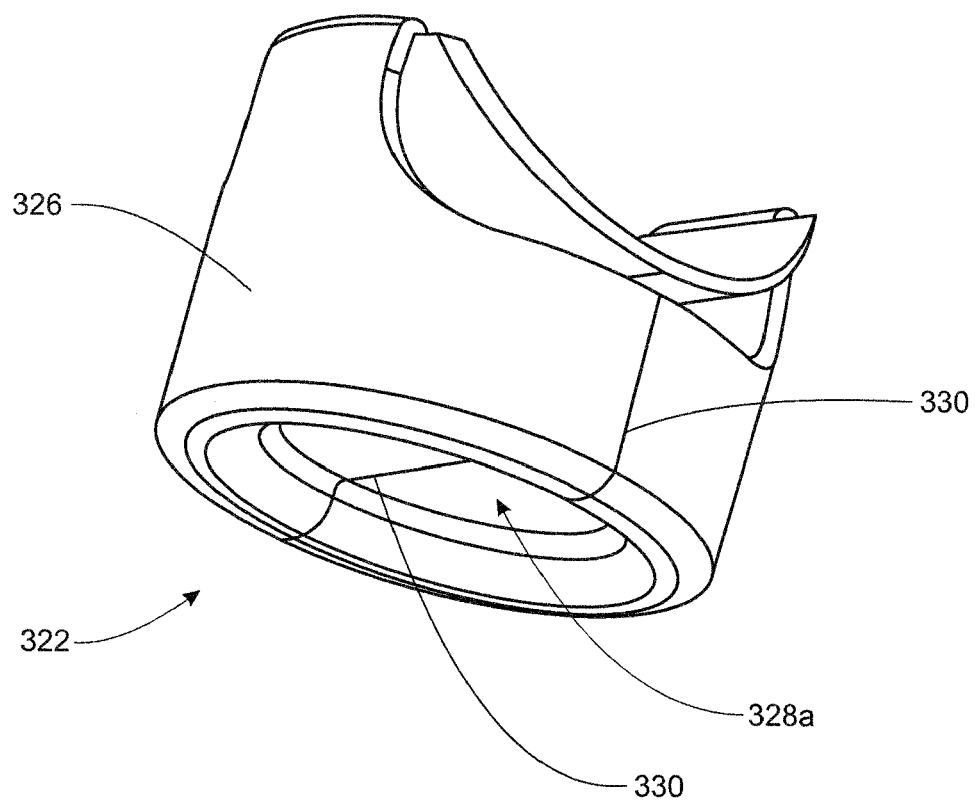
FIG. 4B is an embodiment similar to that shown in FIG. 4A.

As shown in FIG. 4B a stamped and folded yoke similar to that shown in FIG. 4A may include an integral spring pocket 328a. A blank can be stamped from a metallic or metal/polymer composite sheet and the blank may include portions that, when folded, form spring pocket 328a. The blank may be folded and joined at seam 330. Seam 330 may be welded or otherwise joined together to secure the shape of the yoke. The integral spring pocket can eliminate the need for adding separate spring perch 328.

Figure 5:
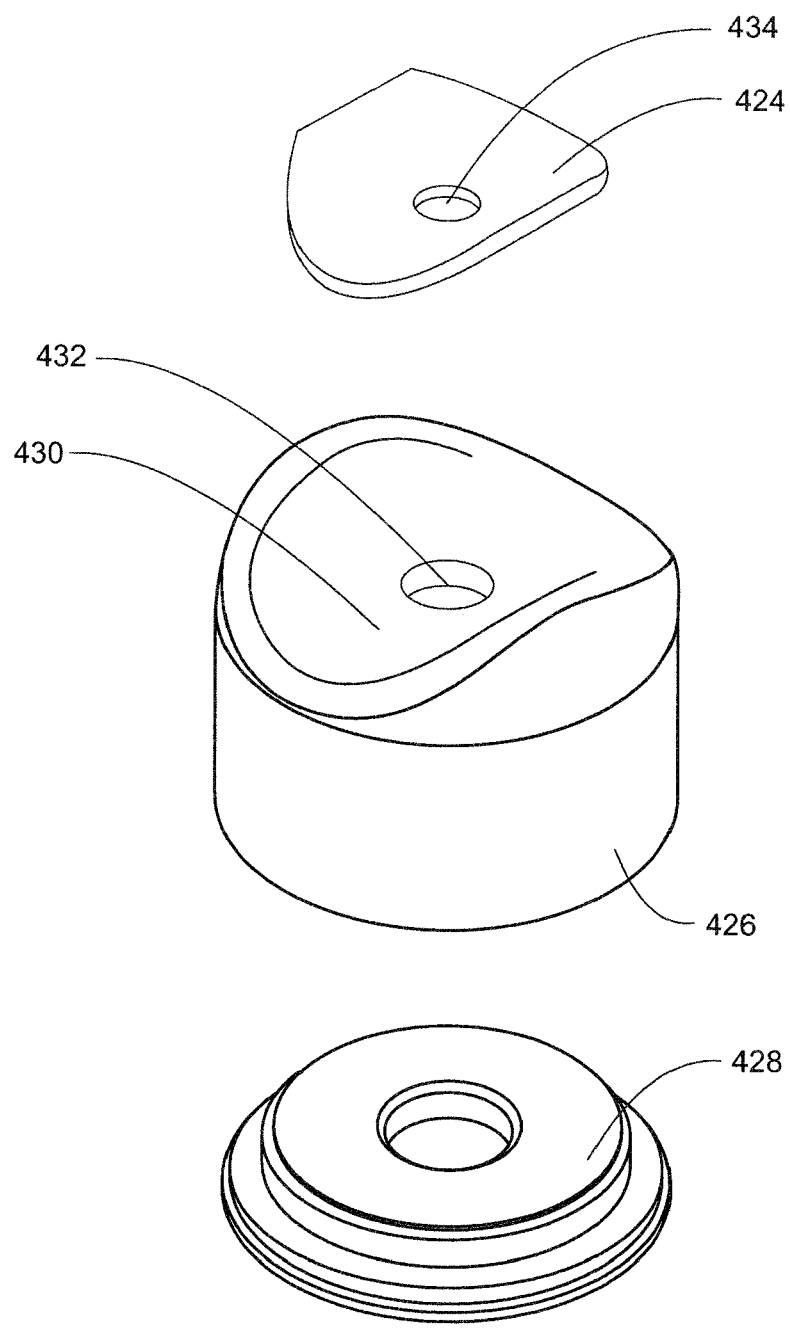
FIG. 5 is a perspective view of another embodiment of a steering yoke.

FIG. 5 illustrates another embodiment in which base 426 may be formed from metal or plastic using molding or drawing techniques. The base includes upper surface 430 which defines receiving hole 432. Separate bearing surface 424 may include a polymer, polymer/metal laminate, fluoropolymer or fluoropolymer/metal laminate as described herein. Bearing surface 424 may include boss 434 which is sized to be press fit in receiver 432. Thus contact surface 424 may be press fit into the yoke body 426 to produce a yoke that includes an arcuate, low-friction, contact surface. Spring perch 428 operates as previously described.

Figure 6:
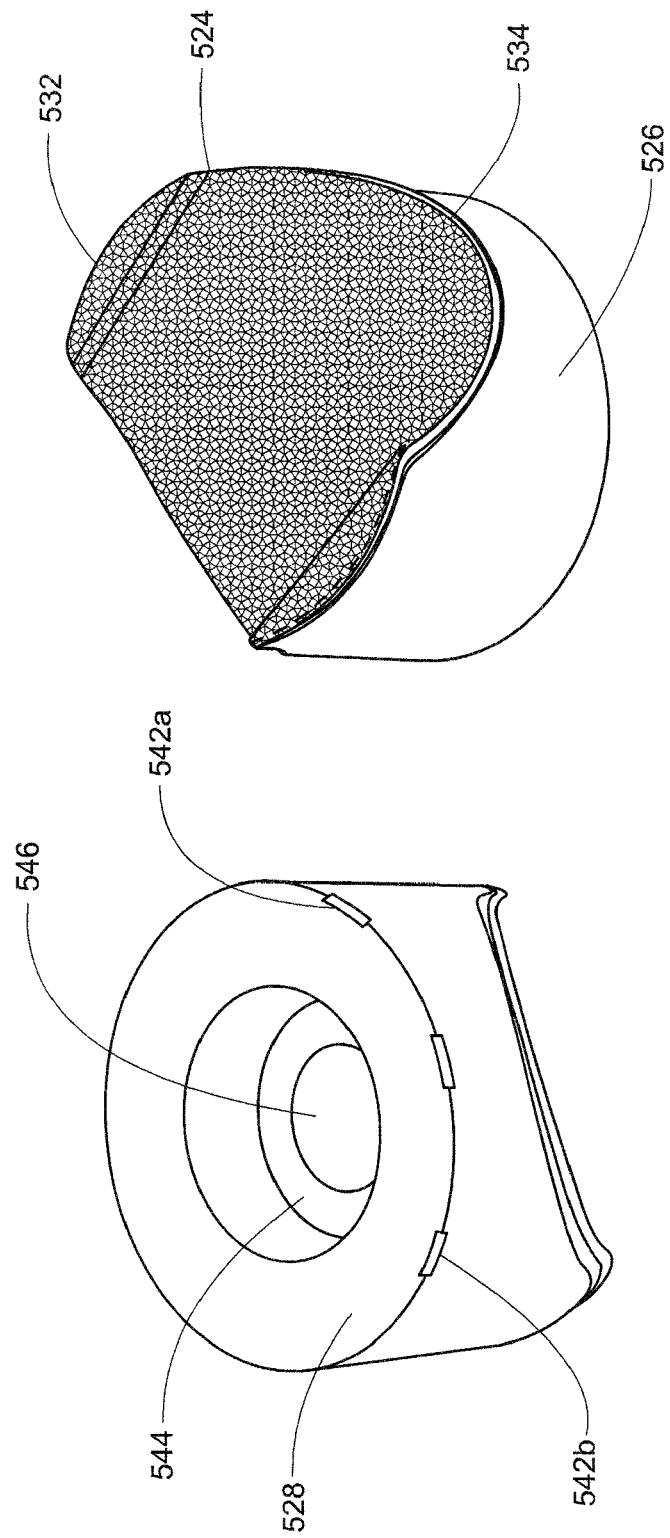
FIGS. 6A and 6B provide a perspective view of another embodiment of a steering yoke.

FIGS. 6A and 6B provide an illustration of a steering yoke produced by rolling or wrapping a metal or metal/polymer sheet around a cylindrical mandrill. Hollow cylindrical body 526 may be formed by first stamping a flat from a metallic or laminate sheet. The flat may then be rolled around a mandrill of appropriate diameter to produce a hollow cylindrical body 526 that is open at both the bottom and top. The edges of cylindrical body may be permanently joined by, for instance, welding. Cylindrical body 526 may optionally include a polymeric coating on the outer surface. Bearing surface 524 may be fabricated separately from cylindrical body 526 and can include a polymeric surface layer that may be textured, as shown. The texture features can provide lubricant reservoirs while still providing contact and support for a steering rack shaft (not shown) across a majority of the arcuate bearing surface. For instance, when biased (by a spring, for example) against a steering rack shaft, edge portion 532 may be subjected to approximately the same pressure against the shaft as is central portion 534. The polymeric coating on bearing surface 524 may be attached to a metallic substrate (e.g., steel or aluminum) by an adhesive or by mechanical bonding, for example. The bearing surface may be formed directly from a laminate or the polymer coating can be attached after the bearing surface is formed. Appropriate polymers may include fluoropolymers and acetal resins and may contain fillers such as graphite or EKONOL. Bearing surface 524 can be permanently attached to cylindrical body 526 by, for example, welding. A mesh screen, such as a bronze mesh screen, may be positioned in or adjacent to the polymer coating.

As shown in FIG. 6A spring perch 528 may be separately formed and may be attached to cylindrical body 526 by welds 542a, 542b, etc. Circular indent 544 can help to retain a spring (not shown) in compression that is kept centered by upwardly projecting dimple 546. Spring perch 528 may be designed to transmit the force provided by the spring equally across opposed bearing surface 524 which can be in contact with a steering rack shaft (not shown). Spring perch 528 may be metallic and in some embodiments can be made of steel or aluminum. It can be formed by, for example, stamping a circular flat with a die of appropriate shape and dimensions.

Figure 7:
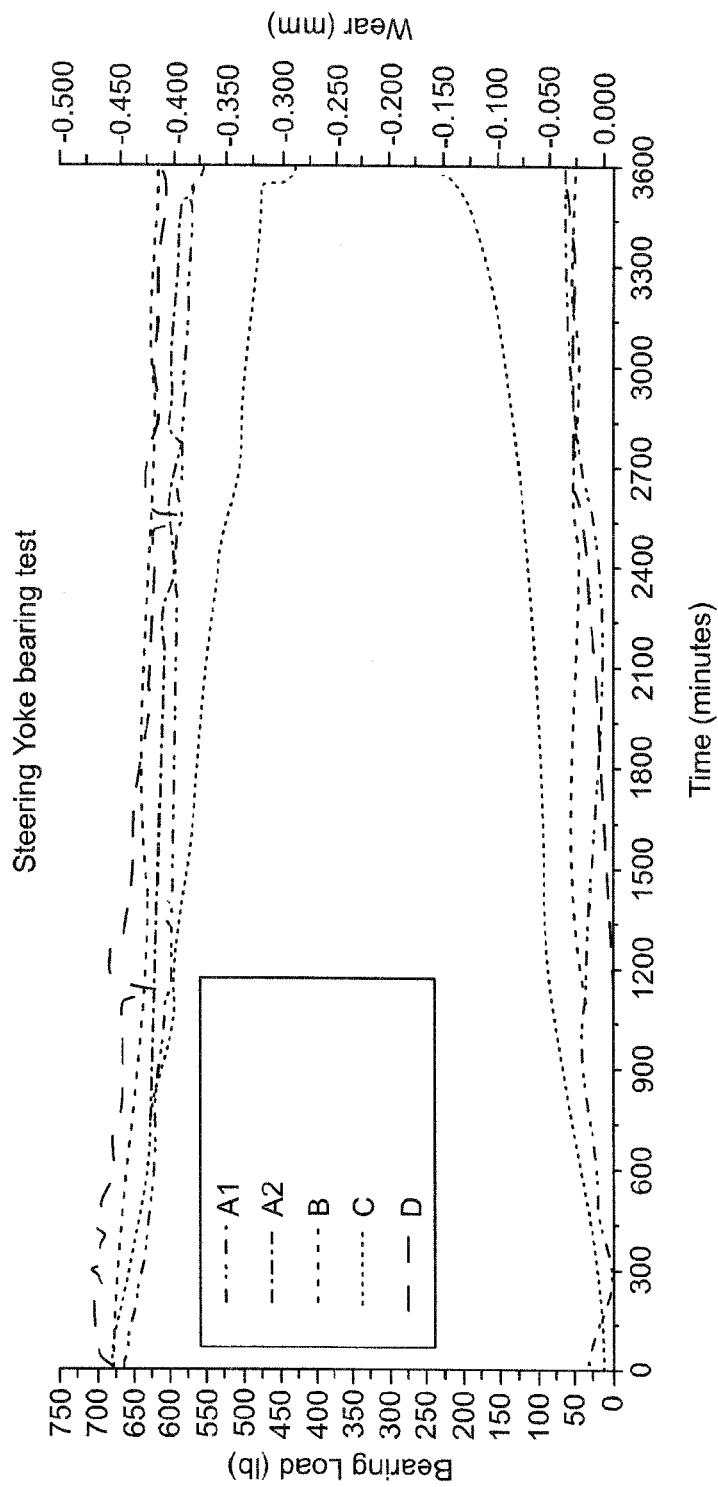
FIG. 7 provides graphical test results for various steering yoke embodiments.
Figure 8:
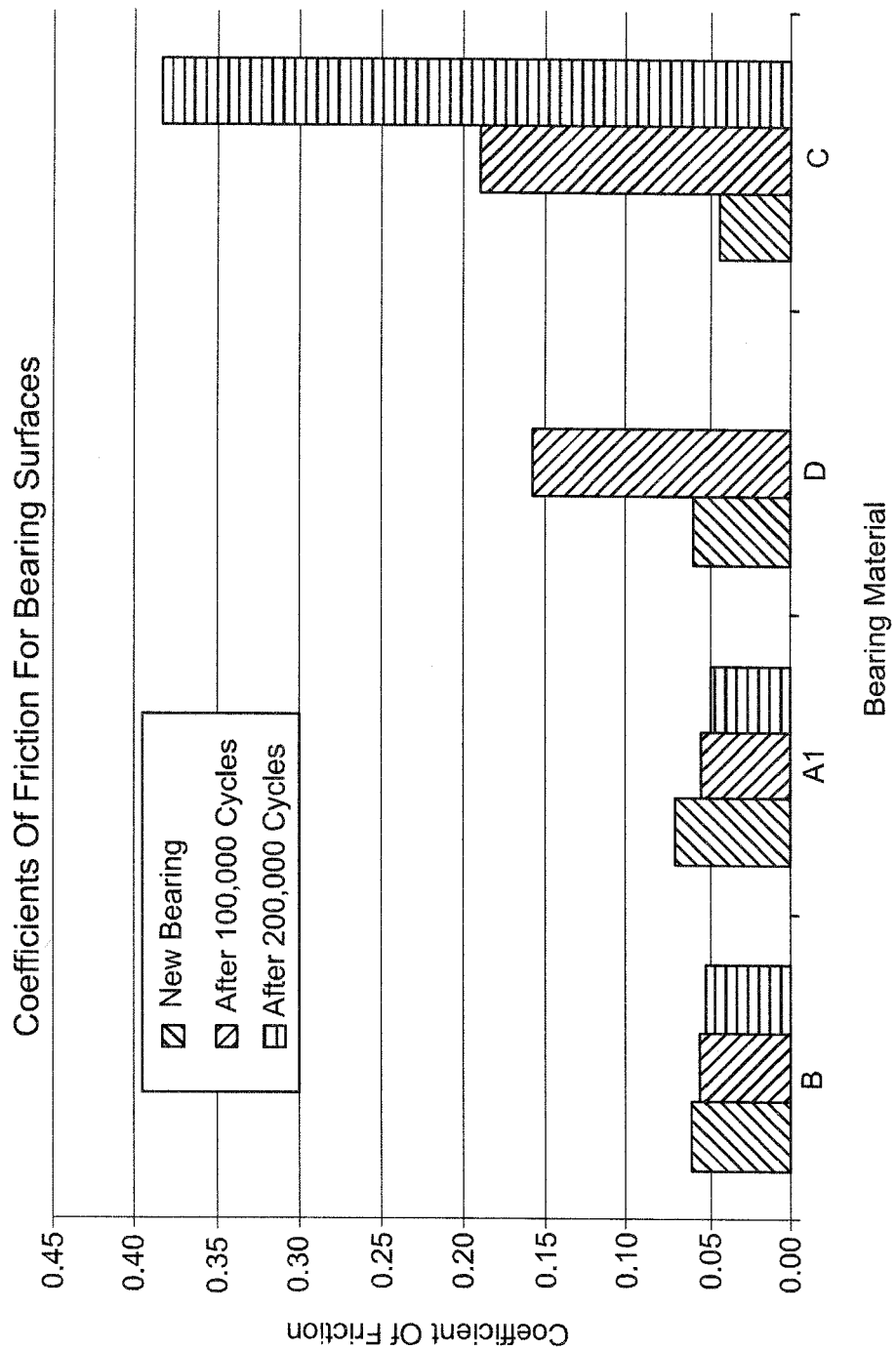
FIG. 8 is a bar graph showing Coefficient of Friction data for various embodiments.

To evaluate different yoke bearing designs, a test was formulated in which different bearing formulations were used in similarly designed bearing structures. Each of the bearing surfaces was subjected to a test in which an initial load of 2935 N was applied for 200,000 cycles at a frequency of 1 Hz and a stroke of +/−90 mm. Each yoke bearing was monitored for 1) change in load; 2) wear; and 3) friction. Each bearing surface was manufactured separately from the yoke and included a gothic arch design. Bearing material A1 was made from NORGLIDE EKO15, a PTFE material including 15% EKONOL and 5% graphite on a steel backing substrate. Bearing material A2 was a duplicate of A1. Bearing material B was made from NORGLIDE SMTL1.0T which is a PTFE material containing 25% EKONOL, and no graphite, on a steel substrate. Bearing C was made from a DX material (Garlock Bearings LLC) that includes a 250 μm layer of acetyl resin over a 250 μm layer of sintered bronze on a steel backing. Bearing D was made from a DU material from Garlock Bearings LLC that includes lead and bronze in a PTFE layer on a steel backing. Each of the tested bearings was lubricated with Shell Alvania Extreme Pressure II lithium grease The graph provided in FIG. 7 illustrates the bearing load and the wear level for each of the tested bearing surfaces. The results indicate that the NORGLIDE bearing surfaces provided a more consistent bearing load and reduced wear when compared to the DX material. Results showed that materials A and B performed comparably to the DU material. FIG. 8 provides coefficients of friction for each of the bearing materials when new, after 100,000 cycles, and after 200,000 cycles. Coefficients of friction were measured using a friction load cell. The NORGLIDE surfaces (A and B) actually resulted in a decrease in (although substantially the same) coefficient of friction with additional cycles. A value for the coefficient of friction is considered to be substantially the same as a second value if it is within 50% of the second value. In some embodiments, the change in coefficient of friction after use may be less than 25% or less than 10% of the original value. The DU and DX materials show significantly increased levels of friction with increasing cycles. To maintain consistent performance in a steering mechanism, a yoke that includes a bearing surface that retains a consistently low level of friction may be preferred. Thus, these results indicate that either of the NORGLIDE materials can provide a superior bearing surface for a steering yoke when compared to the DX or DU material. Examination of each of the bearing surfaces was also instructive. The DU material showed significant wear down to the bronze layer after 100,000 cycles, and the PTFE layer had been completely removed. Materials A and B (NORGLIDE) showed little wear and maintained an intact layer of PTFE across the bearing surface. This can result in a superior combination of consistent bearing load and consistently low coefficient of friction over 200,000 cycles which can provide for a longer product lifetime.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method of forming a steering yoke body comprising:
   rolling a metal sheet into a cylinder having adjoining axial edges;
   affixing the adjoining axial edges of the metal sheet to each other; and
   forming a separate concave arcuate bearing surface;
   attaching the concave arcuate bearing surface to one end of the cylinder, the bearing surface constructed and arranged to receive a steering rack shaft.

2. The method of claim 1, wherein the metal sheet includes a polymeric layer.

3. The method of claim 2, wherein the polymeric layer comprises a fluoropolymer, an acetal resin, or a combination thereof.

4. The method of claim 1, wherein the arcuate bearing surface includes a polymeric layer.

5. The method of claim 1, further comprising affixing a polymeric layer to the concave arcuate bearing surface using an adhesive.

6. The method of claim 1, further comprising:
   inwardly folding a portion of the cylinder at a location opposite the bearing surface to form an integral spring pocket adapted to support a spring.

7. The method of claim 1, further comprising:
   forming a spring perch adapted to support a spring.

8. The method of claim 7, further comprising:
   attaching the spring perch to the cylinder opposite the concave arcuate bearing surface to form a spring platform.

9. The method of claim 1, wherein the concave arcuate bearing surface is formed by:
   cutting a section from a planar sheet; and
   shaping the section to have a generally same radius of curvature as a rack shaft.

10. The method of claim 1, wherein the entire bearing surface is arcuate.

11. The method of claim 1, wherein affixing the adjoining axial edges is performed by welding.

12. The method of claim 1, wherein the cylinder is devoid of a polymeric layer.

13. The method of claim 1, wherein the bearing surface comprises a receiving hole extending through at least a portion of a thickness of the bearing surface.

14. A method of forming a steering yoke body comprising:
   rolling a metal sheet into a cylinder having adjoining axial edges;
   affixing the adjoining axial edges of the metal sheet to each other;
   attaching a concave arcuate bearing surface to one end of the cylinder, the bearing surface constructed and arranged to receive a steering rack shaft, and wherein the bearing surface comprises a polymeric layer; and
   inwardly folding a portion of the cylinder at a location opposite the bearing surface to form an integral spring pocket adapted to support a spring.

15. The method of claim 14, wherein the cylinder is devoid of a polymeric layer.

16. The method of claim 14, wherein affixing the adjoining axial edges is performed by welding.

17. The method of claim 14, wherein the bearing surface comprises a receiving hole extending through a thickness of the concave arcuate bearing surface.

18. The method of claim 14, wherein the cylinder is hollow.

19. A method of forming a steering yoke body comprising:
   rolling a metal sheet into a cylinder having adjoining axial edges;
   welding the adjoining axial edges of the metal sheet to each other;
   forming a separate concave arcuate bearing surface;
   attaching the concave arcuate bearing surface to one end of the cylinder, the bearing surface constructed and arranged to receive a steering rack shaft, comprising a polymeric layer and a receiving hole; and
   forming a spring pocket in the cylinder at a location opposite the bearing surface, the spring pocket adapted to support a spring.

20. The method of claim 19, wherein the cylinder is devoid of a polymeric layer.

* * * * *